No. 685,576. Patented Oct. 29, 1901.
H. J. DAVIS, P. G. AULT & J. H. WIDEMAN.
AUTOMATIC BOILER FEEDER.
(Application filed Feb. 5, 1901.)
(No Model.) 3 Sheets—Sheet 1.
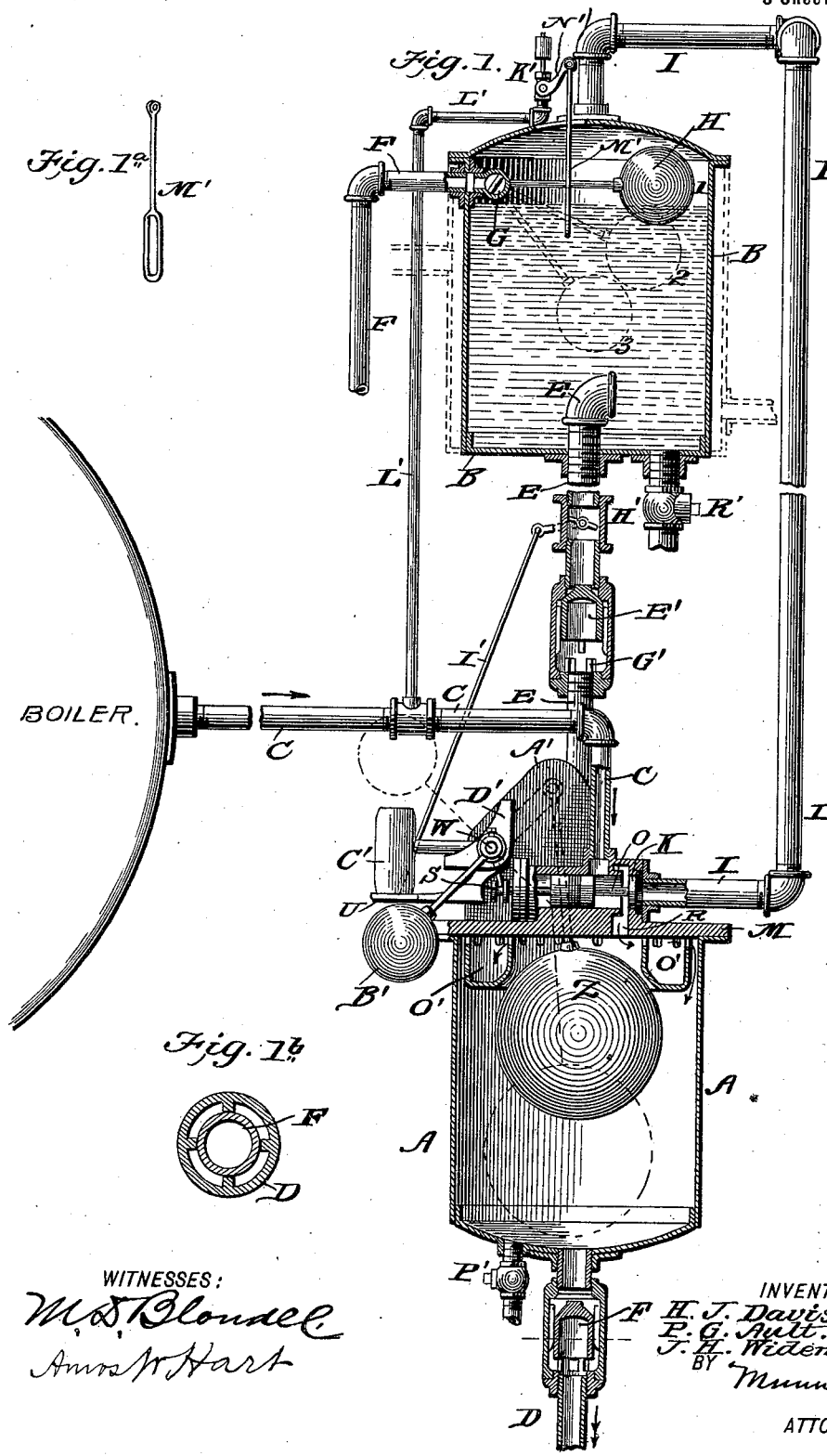
WITNESSES:
M. S. Blondel
Amos W. Hart
INVENTORS:
H. J. Davis.
P. G. Ault.
J. H. Wideman.
BY Munn & Co.
ATTORNEYS No. 685,576. Patented Oct. 29, 1901.
H. J. DAVIS, P. G. AULT & J. H. WIDEMAN.
AUTOMATIC BOILER FEEDER.
(Application filed Feb. 5, 1901.)
(No Model.) 3 Sheets—Sheet 2.
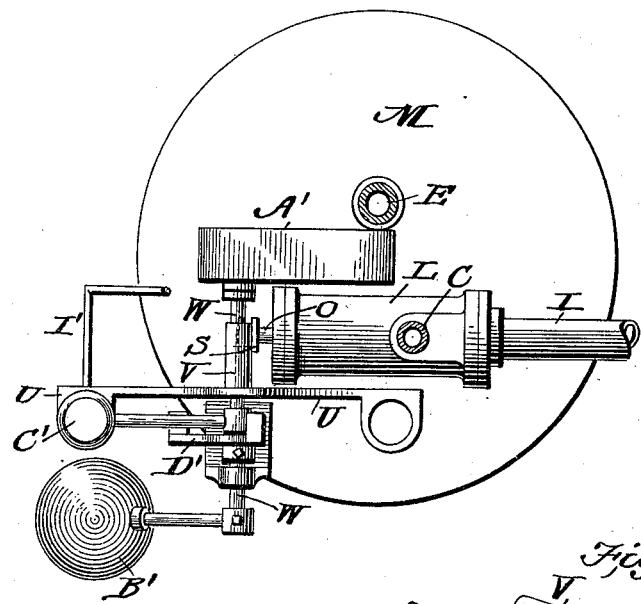
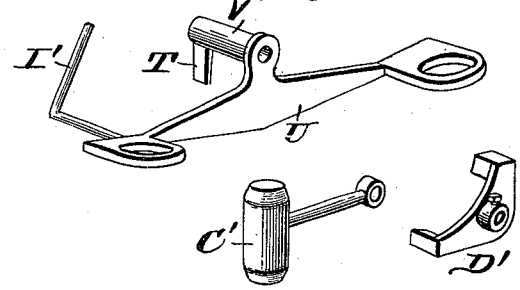
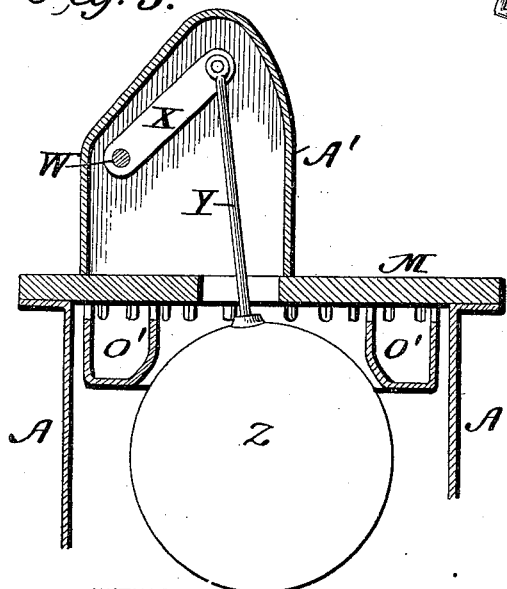
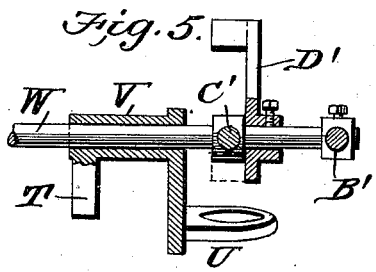
WITNESSES:
INVENTORS:
H. J. Davis.
P. G. Ault.
J. H. Wideman.
BY
ATTORNEYS No. 685,576. Patented Oct. 29, 1901.
H. J. DAVIS, P. G. AULT & J. H. WIDEMAN.
AUTOMATIC BOILER FEEDER.
(Application filed Feb. 5, 1901.)
(No Model.) 3 Sheets—Sheet 3.
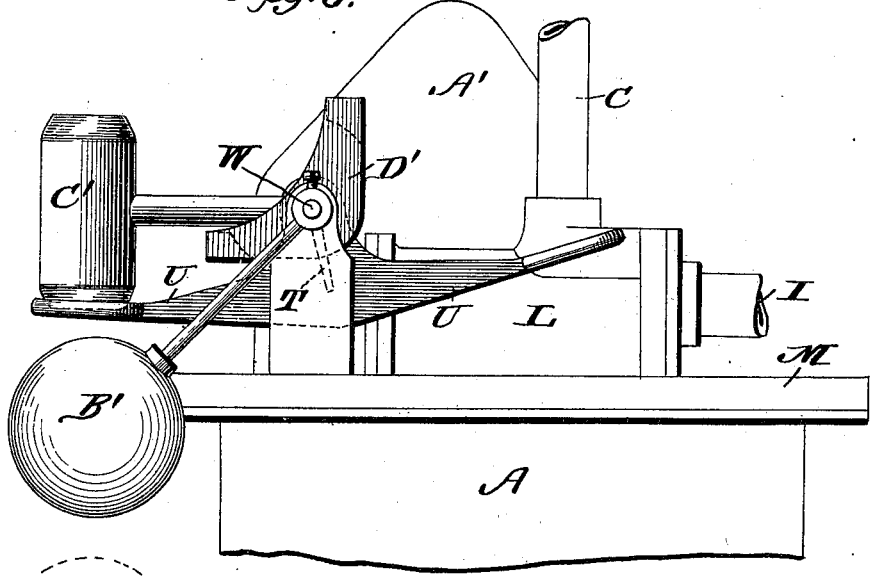
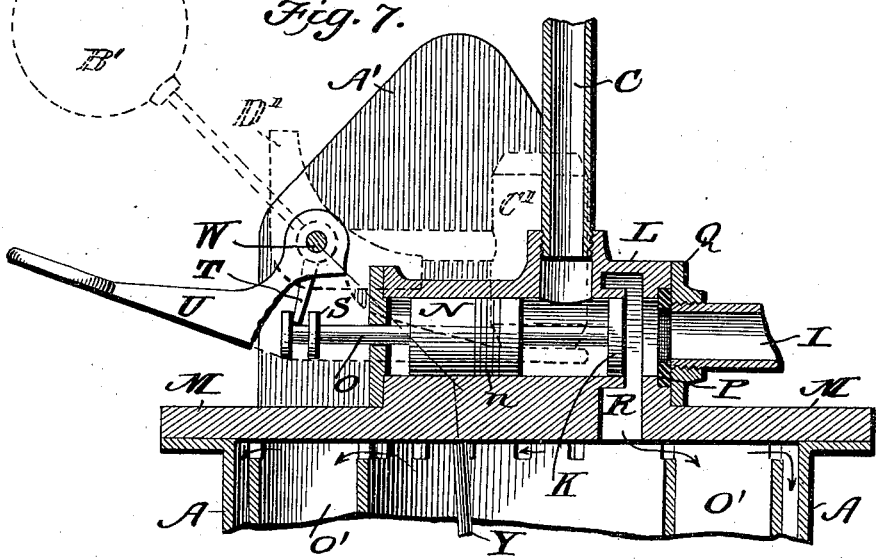
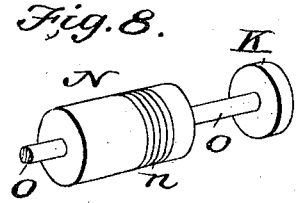
WITNESSES:
INVENTORS:
H. J. Davis.
P. G. Ault.
J. H. Wideman.
BY Munn & Co.
ATTORNEYS

UNITED STATES PATENT OFFICE.

HENRY JACKSON DAVIS, PLAYFAIR GOODWIN AULT, AND JAMES HARDY WIDEMAN, OF BIRMINGHAM, ALABAMA.

AUTOMATIC BOILER-FEEDER.

SPECIFICATION forming part of Letters Patent No. 685,576, dated October 29, 1901.

Application filed February 5, 1901. Serial No. 46,050. (No model.)

*To all whom it may concern:*

Be it known that we, HENRY JACKSON DAVIS, PLAYFAIR GOODWIN AULT, and JAMES HARDY WIDEMAN, citizens of the United States, residing at Birmingham, in the county of Jefferson and State of Alabama, have made certain new and useful Improvements in Automatic Boiler-Feeders, of which the following is a specification.

Our invention is an improvement upon the boiler-feeders covered by Letters Patent granted to Davis, Ault, Bailey, and Wideman—to wit, No. 655,064, dated July 31, 1900, and No. 663,735, dated December 11, 1900. These patents cover certain constructions, combinations, and arrangements of steam and water inlet and outlet valves and floats and connected mechanism for actuating such valves, the whole being so arranged in connection with a tank as to automatically recharge a boiler whenever the water-level therein is lowered below a certain predetermined point of safety. We have devised improvements in the construction and arrangement of valves and connected mechanism, with a water-tank and a preliminary water-heater and steam-condenser, whereby important practical advantages are obtained, as hereinafter set forth.

In the accompanying drawings, Figure 1 is a vertical section of our improved boiler-feeder. Figs. 1ª and 1ᵇ are detail sections. Fig. 2, Sheet 2, is a plan view of the feeder. Fig. 3 is a vertical section of the top portion of the water-supply tank. Fig. 4 is a perspective view illustrating detached parts of the mechanism for operating the steam-valve of the water-tank. Fig. 5 is a vertical section of such mechanism connected for operation. Fig. 6, Sheet 3, is an enlarged side view of the top of the water-supply tank and valve-operating mechanism. Fig. 7 is a vertical section of parts shown in Fig. 6, and Fig. 8 is a perspective view of the steam-valve and its guide and seat.

The water-tank A (see Fig. 1) is connected with a boiler by means of a steam-pipe C and water-pipe D, which are attached to said tank at top and bottom, respectively. A steam-condensing tank and preliminary water-heater B is located above such boiler-supply tank A and connected with the latter by a pipe E, whose upper end projects above the bottom of tank B in order to prevent entrance of sediment. A pipe F leads from the upper portion of the condensing-tank B to a suitable source of water-supply. (Not shown.) The discharge end of said pipe F projects into the tank and is provided with a valve G, whose position is governed by a float H, as will be further described hereinafter.

A pipe I connects the top of condensing-tank B with supply-tank A and serves to conduct exhaust-steam from the latter to the former.

The admission of steam to tank A for effecting discharge of the contents of the latter into the boiler and the exhaust of steam from said tank following such discharge are controlled, primarily, by a disk valve K. (See Figs. 1 and 8.) We will now describe the construction and arrangement of said valve K and the means for automatically operating it. The cylinder L of said valve is formed on the head M of tank A, the same being cast integrally therewith and suitably bored to receive the sliding guide and packing-cylinder N of valve K, both of which are fast on a rod O, that works loose or without a stuffing-box in a head of the cylinder L. The slide or valve guide N is an elongated cylinder provided with a series of circumferential packing-rings n, which enable a stuffing-box to be dispensed with, whereby friction is diminished and rendered uniform. In the case of a stuffing-box it is impracticable to form a steam-tight joint without excessive friction, which is constantly varying owing to wear, whereby it becomes more or less leaky and requires repacking. The valve K seats against a vulcanized-rubber packing-ring P, (see Figs. 1 and 7,) which is arranged between the end of cylinder L and the head Q of the same. The said ring P fits into a rabbet in the cylinder L and is flush with the portion of the latter against which the head Q is bolted. By this arrangement the said head Q not only holds the ring P in place, but serves also for attachment of the exhaust-steam pipe I, to which the steam passage is directly through the head Q and ring P. The steam-inlet pipe C connects with cylinder L, near the head Q thereof, and the said cylinder L and tank-head M are provided with a steam-port R, as shown, across which the valve K moves for cutting off admission of live steam and permitting exhaust or the reverse. In Figs. 1, 2, and 6 the valve K is in position to admit live steam and arrest exhaust, and in Fig. 7 the valve is retracted to cut off live steam and permit exhaust into pipe I, as will be readily understood. The outer end of the valve-rod O is provided with a head S, having a circumferential groove, which receives the point of an arm T, forming an attachment of a tappet-lever U. (See Fig. 4.) The said lever is rigidly connected with the arm T by means of a sleeve V, which is mounted loose on the rock-shaft W. The latter is arranged in bearings on the head of the tank A and is connected by a lever-arm X (see Fig. 3) with the stem or rod Y of a float Z, arranged and adapted to operate in the water-supply tank A. The said arm X and float-rod Y are protected by a hood A', forming a vertical attachment of the head M of tank A. The said float Z is counterbalanced by a weight B', whose stem is clamped on the shaft W, as shown. The tappet-lever U is adapted to rock free on the shaft W, and by its shifting movement the valve K, with its guide N, is reciprocated, the movement being sudden, so that steam is admitted to or cut off from the tank A practically instantaneously. The said tappet-lever U is shifted by means of a hammer C', which is thrown from side to side, the two positions being illustrated in Figs. 1, 6, and 7. The hammer-shank is mounted loose on the shaft W, and an elbow-lever D', which is keyed on the shaft W, serves as the means for throwing the hammer from one position to the other. For this purpose the said elbow-lever D' is provided with lateral projections or lugs, which alternately take under the hammer-shank and lift the hammer to the vertical position, from which it falls by its own weight and strikes upon the large ends of the tappet-lever U. Thus it will be understood that the tank A is supposed to be full or nearly full of water in Fig. 1 and that the float Z is therefore supported at the highest limit. In this position the valve K is closed and shuts off the exhaust and steam is being admitted for equalizing pressure in the boiler and tank and forcing water out of the latter into the boiler. As the water discharges from the tank A the float Z falls, and the shaft W is thereby rocked so that the elbow-lever D' raises the hammer C' and throws it over to the right, so that it falls upon the right-hand end of the tappet U, and thereby it causes the latter to instantaneously shift the valve to the other position, as shown in Fig. 7, whereby the exhaust is opened and the live-steam port closed. When the tank A is refilled, it is apparent the float Z will be raised from the position indicated by dotted lines, Fig. 1, to the position shown in full lines, whereby the shaft W will be rocked in the opposite direction and the elbow-lever D' throw the hammer C' over at the left, and thereby shift the valve to the right.

Within an enlargement of the pipe E is arranged a valve E', and within the water-pipe D, connected with the tank A, is arranged a similar valve F', both of which seat upward, whereby it results that when one is opened the other is closed, and vice versa. Each valve is hollow and cylindrical in form and provided with a conical head or seat. It is guided vertically by means of ribs formed on the inner side of the enlargement of the pipe E, and in its lower position it rests upon projections or lugs G'. By this construction water may pass freely downward past either of the valves E' or F', but is prevented from passing in the opposite direction. In the uppermost position of the valve E' steam is prevented from passing upward into the condensing-tank B, and the lower valve F' serves as a water-check valve, as will be readily understood. Above the steam-check valve E' is arranged a "butterfly-valve" H', whose lever-arm is connected by a rod I' with the tappet-lever U, so that the butterfly-valve is shifted from the open to the closed position with the shifting of the tappet-lever and valve K. It will be seen that the valves E' and F' open downward by their own gravity and do not require any part of the water weight to open them. The butterfly-valve H' is employed to prevent any excessive strain on the steam-valve E'. On the condensing-tank B we arrange a whistle K', which is connected by a pipe L' with the steam-pipe C, leading from the boiler, so that steam-pressure is constantly on in said pipe L. A rod M' having a slot, as shown in Fig. 1, is pendent from an arm N', connected with the valve of the whistle K'. The stem of the float H passes through the slot of rod M', and when said float falls to its lowest position by reason of its discharge of water from tank B the whistle-valve will be opened and the whistle sounded, thus giving an alarm. At the same time such position of the float H opens the valve G and admits a fresh supply of water to the tank B. The float H is shown in three positions, one being by full lines and the others by dotted lines. Position No. 1 shows the uppermost one, in which inlet-valve G is closed and the supply cut off. No. 2 shows the position of float H and valve G when water is discharging from tank B and a supply being admitted. No. 3 shows position of float and valve if water-supply fails.

The pipe I conducts exhaust-steam upon the surface of the comparatively cool water in tank B. There can be but little pressure in the latter, and such as there is only accelerates filling up the feeder-tank A. The tank B has no free opening save the slot through which the rod M' works, and little steam escapes at that point. The tank has a jacket, as shown by dotted lines, that receives exhaust-steam, whereby the water is heated to a high degree, in which condition it is supplied to tank A.

We show in Figs. 1 and 7 a hollow steam baffle-ring O'. The same is arranged in tank A under and secured to the head M thereof. It has steam exit or outlet openings at the top, save at a point adjacent to the port R. The function of this ring is to prevent a sudden thrust of steam from moving or jerking the displacing float or levers and to assist in keeping down "water-hammer," since there will be a uniform lateral distribution of steam over the whole water-surface.

Both tanks A and B are provided with blow-off pipes P' and R', respectively.

What we claim is—

1. In a boiler-feeder, the supply-tank having a head and valve-cylinder constructed integrally, said cylinder being arranged horizontally and having a steam-port leading from the cylinder into the tank, inlet and exhaust pipes connected with the side and one end, respectively, of said cylinder, the valve adapted to reciprocate in the latter, and means for automatically shifting the valve as required to admit steam, or cut off and allow exhaust, alternately, as shown and described.

2. In a boiler-feeder, the combination with the supply-tank, of the valve-cylinder, a valve adapted to reciprocate therein, an annular valve-seat arranged at one end of the cylinder, an annular head secured to the latter and holding the said seat in place, an exhaust-pipe attached to said head, and a valve adapted to slide and seat on the ring, substantially as specified.

3. In a boiler-feeder, the supply-tank having a valve-cylinder fixed on the head thereof and provided with a rabbet at one end, an annular valve-seat arranged in said rabbet, a cylinder-head having an exhaust-opening and secured for holding the said seat in place, an exhaust-pipe attached to the head, a sliding cylindrical valve adapted to seat as described, and means for operating it, as specified.

4. In a boiler-feeder, the combination with the supply-tank having a head provided with a valve-cylinder, a disk valve K arranged to reciprocate therein, an elongated cylindrical sliding guide N, a piston connecting said valve and guide, the latter having one or more circumferential packing-rings, and means for actuating the valve and guide, as shown and described.

5. In a boiler-feeder, the combination with the supply-tank, a valve-cylinder arranged horizontally and provided with a port leading into the cylinder, a valve adapted to slide in said cylinder, inlet and exhaust pipes, a rock-shaft arranged in bearings on the top of the cylinder, a float rigidly connected with the shaft, a tappet-lever mounted loose on the shaft and having a rigid arm that engages the valve-stem, a hammer mounted loose on the shaft, and means for connecting the float and hammer and throwing the latter, as specified.

6. In a boiler-feeder, the supply-cylinder having a steam-inlet in its head, and an annular baffle arranged beneath said head and adapted to distribute steam in the tank, substantially as shown and described.

7. In a boiler-feeder, the combination with condensing and supply tanks and water and exhaust-steam pipes connecting them, a water-discharge pipe attached to the supply-tank, and slidable valves arranged in the two water-pipes and adapted to seat upward, guide-ribs and lugs arranged in the pipes and offsetting said valves, to form a water-passage, as shown and described.

8. In a boiler-feeder, the combination with the condensing-tank and supply-tank and a water-pipe connecting them, of a slidable valve arranged in said pipe and seating upward, means for supporting it free when in the reverse position, to form a water-passage as specified, a slidable steam-valve, mechanism for automatically operating it, a valve arranged above the first-named or slidable valve, and means for shifting it simultaneously with the shifting of the steam-valve, substantially as shown and described.

9. In a boiler-feeder, the combination with the condensing and supply tanks and a water-pipe connecting them, a valve adapted to slide in said pipe, a "butterfly-valve" arranged above such slidable valve, a slidable steam-valve and cylinder therefor, a float in the supply-tank and automatic mechanism connected therewith for operating the steam-valve, and a rod connecting the butterfly-valve with said mechanism, as shown and described.

10. In a boiler-feeder, the combination with the condensing and supply tanks and water and exhaust-steam pipes connecting them, of a steam-pipe connecting the supply-tank and boiler, a water-supply pipe leading into the condensing-tank, a valve applied to said supply-pipe, and having a weighted arm, a steam-whistle arranged on the tank, a steam-pipe leading to the whistle, a rod pendent from the latter within the tank and having an engagement with the valve-arm, whereby the latter operates the whistle when in the "low-water" position, as shown and described.

HENRY JACKSON DAVIS.
PLAYFAIR GOODWIN AULT.
JAMES HARDY WIDEMAN.

Witnesses:
GEO. H. BUNCH,
W. D. COOPER.